US009169112B2

(12) United States Patent
Chase et al.

(10) Patent No.: US 9,169,112 B2
(45) Date of Patent: Oct. 27, 2015

(54) BEVERAGE DISPENSER WITH MULTI-CHAMBERED CAROUSEL AND AUTOMATIC COORDINATION OF FLAVORANT FLOW RATE

(75) Inventors: Kevin M. Chase, Saint Joseph, MI (US); Nihat Cur, Saint Joseph, MI (US); Gregory G. Hortin, Henderson, KY (US); Michael E. Stagg, Evansville, IN (US); Tiemen Van Dillen, Varese (IT); John R. Wisnoski, Haubstadt, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 530 days.

(21) Appl. No.: 12/915,118

(22) Filed: Oct. 29, 2010

(65) Prior Publication Data

US 2012/0103197 A1 May 3, 2012

(51) Int. Cl.

| | |
|---|---|
| ***A47J 31/40*** | (2006.01) |
| ***A47J 31/06*** | (2006.01) |
| ***B67D 1/00*** | (2006.01) |
| ***B67D 1/08*** | (2006.01) |
| ***B67D 1/12*** | (2006.01) |
| ***B67D 7/02*** | (2010.01) |
| ***B67D 7/74*** | (2010.01) |

(52) U.S. Cl.

CPC ............ *B67D 1/0027* (2013.01); *B67D 1/0031* (2013.01); *B67D 1/0032* (2013.01); *B67D 1/0078* (2013.01); *B67D 1/0857* (2013.01); *B67D 1/0878* (2013.01); *B67D 1/0888* (2013.01); *B67D 1/0889* (2013.01); *B67D 1/1243* (2013.01); *B67D 7/02* (2013.01); *B67D 7/74* (2013.01); *B67D 2001/082* (2013.01); *B67D 2001/0811* (2013.01)

(58) Field of Classification Search

CPC .. B67D 1/0027; B67D 1/0031; B67D 1/0032; B67D 1/0078; B67D 1/0857; B67D 1/0878; B67D 1/0888; B67D 1/0889; B67D 1/1243

USPC .............. 99/280, 283, 286, 295, 299; 222/57, 222/129.1

See application file for complete search history.

(56) References Cited

U.S. PATENT DOCUMENTS

| | | | | |
|---|---|---|---|---|
| 5,000,351 | A | 3/1991 | Rudick | |
| 5,507,329 | A * | 4/1996 | Shub | 141/351 |
| 5,573,285 | A | 11/1996 | Ridenour | |
| 6,053,359 | A | 4/2000 | Goulet et al. | |
| 6,450,369 | B1 | 9/2002 | Heyes | |
| 6,786,134 | B2 | 9/2004 | Green | |

(Continued)

FOREIGN PATENT DOCUMENTS

| | | | |
|---|---|---|---|
| EP | 0387477 | A1 | 9/1990 |
| EP | 1199279 | A2 | 4/2002 |

(Continued)

*Primary Examiner* — Dana Ross
*Assistant Examiner* — Lindsey C Teaters

(57) ABSTRACT

An appliance includes a dispenser for dispensing a mixture of a diluent and a consumable. The mixture may be a beverage wherein the diluent is water and the consumable is a flavorant. The dispenser includes a pressure sensor for measuring the pressure of the diluent at the inlet. The rate at which the consumable is added to the diluent is dependent upon the pressure of the diluent at the inlet. The consumable may be provided in a single container, or a user may specify a particular type of consumable from a plurality of containers provided on a rotation carousel.

15 Claims, 4 Drawing Sheets

(56) References Cited

U.S. PATENT DOCUMENTS

| | | | | |
|---|---|---|---|---|
| 6,845,704 | B2 | 1/2005 | Lassota et al. | |
| 7,279,190 | B1 | 10/2007 | Lassota et al. | |
| 7,578,419 | B2 | 8/2009 | Greenwald et al. | |
| 2003/0145736 | A1 * | 8/2003 | Green | 99/280 |
| 2004/0255790 | A1 | 12/2004 | Green | |
| 2005/0095158 | A1 | 5/2005 | Kirschner et al. | |
| 2006/0000851 | A1 | 1/2006 | Girard et al. | |
| 2006/0016347 | A1 | 1/2006 | Girard et al. | |
| 2006/0144244 | A1 | 7/2006 | Girard et al. | |
| 2006/0283884 | A1 * | 12/2006 | Saggin et al. | 222/129.4 |
| 2007/0130965 | A1 | 6/2007 | Boarman et al. | |
| 2008/0047973 | A1 | 2/2008 | Elsom | |
| 2008/0173705 | A1 | 7/2008 | Girard et al. | |
| 2009/0057341 | A1 * | 3/2009 | Girard et al. | 222/129.1 |
| 2010/0024657 | A9 * | 2/2010 | Nosler et al. | 99/289 R |

FOREIGN PATENT DOCUMENTS

| | | | |
|---|---|---|---|
| EP | 1207131 | A1 | 5/2002 |
| EP | 1489042 | A1 | 12/2004 |
| EP | 1474021 | B1 | 6/2006 |
| WO | 9636556 | A1 | 11/1996 |
| WO | 03/065859 | A2 | 8/2003 |
| WO | 2006/029109 | A2 | 3/2006 |
| WO | 2006/090183 | A2 | 8/2006 |
| WO | 2008/037974 | A1 | 4/2008 |

* cited by examiner

BEVERAGE DISPENSER WITH MULTI-CHAMBERED CAROUSEL AND AUTOMATIC COORDINATION OF FLAVORANT FLOW RATE

FIELD OF INVENTION

The invention relates to appliances that mix a consumable, such as a flavorant, with water. More particularly, the invention relates to mechanisms for storing and selecting the consumable to be mixed with the water and to controlling the amount of consumable mixed with the water.

BACKGROUND OF THE INVENTION

Household appliances that mix a consumable with water are known. For example, household appliances that include a beverage dispenser that can mix and dispense a flavored beverage are known. Typically, the appliance will be attached to an outside source of water, such as household tap water. The appliance may also include a receptacle for receiving a pod, pouch, or other container that includes concentrated flavorant for mixing with the water to create a flavored beverage. The flavorant may be a liquid or powder that mixes with the water to form the beverage. Alternatively, the flavor could be tea leaves, coffee grounds, or similar flavorant that imparts flavor to the water without being completely mixed into the water.

In order to obtain the proper flavor for the beverage, the appropriate amount of flavorant must be added to the water as the beverage is mixed. Due to flow rate variations resulting from pressure differences from location to location, it can be difficult to add the appropriate amount of flavorant to the water as the beverage is being mixed.

Consumers that desire to mix water with a consumable are required to purchase, store, retrieve, and sometimes prepare the mixture to meet their particular preferences. For example, consumers may mix flavored beverages. In recent years, consumers have turned to single-serve pouches or other containers to flavor their hot or cold beverages through counter-top or water-cooler based systems. These containers contain a powder, concentrate or grounds that mix with water to create the beverage that must be carefully metered with a set amount of water to obtain the proper taste. Many existing dispensers require a user to insert a new flavorant container each time they wish to change the flavor of the beverage being dispensed. Furthermore, different types of flavorant require different mixing ratios, and some consumers prefer stronger or weaker flavored beverages, which can make a standardized mixing ratio difficult to select and ineffective for mixing an optimally flavored beverage.

In addition to dispensing flavored beverages, appliances also dispense other consumables that mix with water. For example, washing machines may dispense laundry detergent that mixes with water and dishwashers may dispense concentrated dish soap.

BRIEF SUMMARY OF THE INVENTION

According to one embodiment, the present invention is a household appliance that has a water inlet for attachment to a water supply, a container containing a consumable, and a dispenser that selectively dispenses a portion of the consumable from the container. A pressure sensor senses a water pressure at the water inlet. A dispenser control automatically varies a rate at which the dispenser dispenses the consumable dependent upon the water pressure at the water inlet. The consumable may be a flavorant. The appliance may further have an input for indicating a desired beverage strength, and further wherein the dispenser control automatically varies a rate at which the dispenser dispenses the consumable dependent upon an input desired beverage strength. The dispenser control may be a microprocessor. The appliance may include a sensor for sensing an information indicator on the container and a display for displaying information about the container based on the information indicator.

According to another embodiment the present invention is a household appliance with a water and flavored beverage dispenser that allows a consumer to select a flavorant to be added to water to form a flavored beverage. The appliance has an appliance body and a rotatable carousel mounted in the appliance body that includes a plurality of sockets for receiving containers containing flavorant. A plurality of containers are provided in the sockets. A sensor senses a property of a first container retained in a first socket. A display displays the sensed property. A dispensing mechanism selectively dispenses flavorant from the first container into a supply of water to form a beverage. The appliance may also include an input for indicating a desired beverage strength and a dispenser control that automatically varies a rate at which the dispenser dispenses the consumable dependent upon an input desired beverage strength. The property of the first container may be an indication of the flavor of the flavorant. The sensor may sense an indication of whether the container was provided by an approved source.

According to another embodiment, the present invention is a household appliance that includes an appliance body and a rotatable carousel mounted in the appliance body that includes a plurality of sockets for receiving flavorant containers. A water inlet for attachment to a water supply is included as part of the appliance. A plurality of flavorant containers containing flavorant are provided in the sockets. A flavorant dispenser selectively dispenses flavorant from one of the flavorant containers. A pressure sensor senses a water pressure at the water inlet. A dispensing mechanism selectively dispenses flavorant from the first flavorant container into a supply of water to form a flavored beverage. A dispensing mechanism control automatically varies a rate at which the dispensing mechanism dispenses the flavorant dependent upon the water pressure at the water inlet. The household appliance may further include an input for indicating a desired beverage strength. The dispenser control automatically varies a rate at which the dispenser dispenses the consumable dependent upon an input desired beverage strength. The appliance may further have a sensor for sensing a property of a first container retained in a first socket that is an indication of the flavor of the flavorant in the first container. The sensor may sense an indication of whether the container was provided by an approved source. The dispensing mechanism control may include a microprocessor.

DETAILED DESCRIPTION OF PREFERRED EMBODIMENTS

Figure 1:
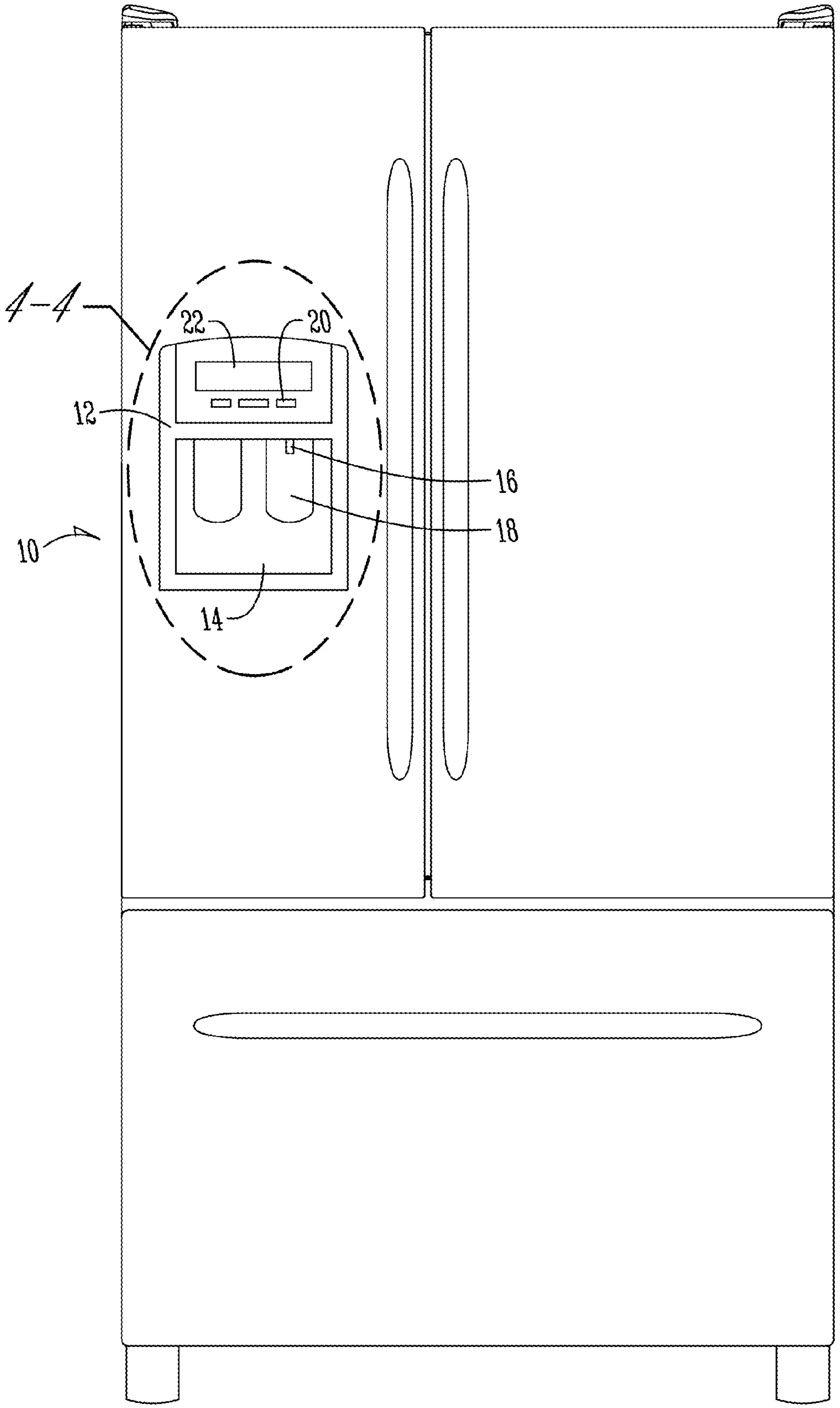
FIG. 1 is a front elevation view of an appliance that includes a dispenser according to an embodiment of the present invention.

FIG. 1 shows an appliance 10 that includes a beverage dispensing unit 12. The dispensing unit 12 includes a dispensing area 14 for selectively dispensing a beverage into a container (not shown). The dispensing unit 12 includes an outlet 16 from which a beverage may be dispensed into the dispensing area 14. An activation paddle 18 is provided that may be pressed by a container in order to initiate a dispensing cycle. The paddle 18 may be connected with a pressure sensitive switch, a contact switch, a mechanical linkage, or other known mechanism for initiating dispensing. Alternatively, other actuation mechanisms, such as a push button may be utilized. The dispensing unit 12 may include controls 20 to control various functions. The controls 20 may be buttons or other input mechanisms. A display device 22 is provided in the dispensing unit 12 for providing information about the status of the dispensing unit. The display device 22 could be provided remotely from the dispensing unit 12. The dispensing unit 12 may also include ice dispensing and other features. In the embodiment shown the appliance 10 is a household refrigerator. However, a dispensing unit 12 according to the present invention may be included in other appliances, such as a standalone coffee maker or tea maker, a water cooler, a washing machine, or a dishwasher.

Figure 2:
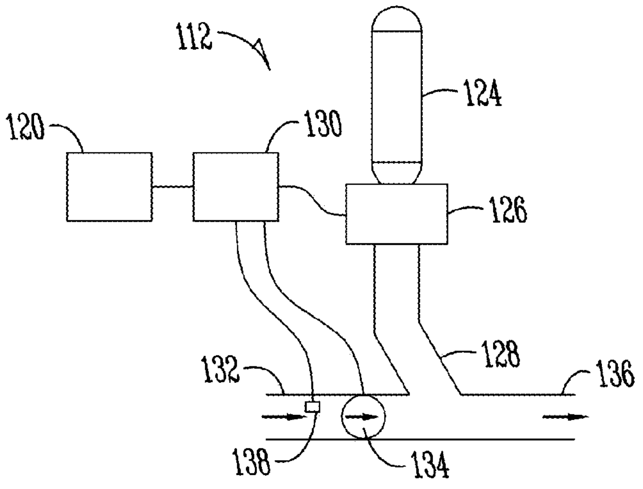
FIG. 2 is a schematic of a dispenser according to one embodiment of the present invention that coordinates flow rate of a consumable based on incoming water pressure.

FIG. 2 is a schematic view of a dispenser 112 according to one embodiment of the present invention. A consumable container 124 contains a supply of a consumable such as a flavorant, a detergent, or other concentrate. The consumable container 124 may be a cartridge, pod, or flexible bag. The container maybe of the type generally shown and described in U.S. patent application Ser. No. 12/915,081 (SUB-US20090110-US-NP) titled LIQUID DISPENSER WITH COLLAPSIBLE CONTAINER filed Oct. 29, 2010, which is hereby incorporated by reference in its entirety.

The consumable container 124 is provided in connection with a consumable dispensing actuator 126. The actuator 126 selectively dispenses a portion of the consumable through consumable outlet 128. A controller 130, such as a microprocessor, controls the actuation of the actuator 126. External controls 120 also provide input to the controller 130. The external controls may include input devices, such as the controls 20 shown in FIG. 1. Water enters the dispensing unit 112 via water inlet 132. Typically the water will be tap water supplied by residential plumbing. A control valve 134 selectively controls flow of water from the inlet 132 to an outlet 136. The valve 134 may be controlled to move between an open and a closed position by controller 130. When the valve 134 is opened water flows through the valve 134 and out the outlet 136. The consumable can be added to and mixed with the water to form a desired mixture by simultaneously actuating the actuator 126 to dispense a portion of the consumable through consumable outlet 128 to mix with the water at the outlet 136.

A pressure sensor 138 is provided in the water inlet 132 to measure the input pressure of the water supply. The sensor 138 sends a signal to the controller 130 indicating the water pressure. The controller 130 varies the rate at which the actuator 126 dispenses the consumable dependent upon the pressure level of the water. Roughly speaking the flow rate of water through the valve 134 will be proportional to the water pressure. Therefore, a higher inlet water pressure leads to a greater flow rate of water, which requires a higher rate of dispensing the consumable in order to maintain a desired proportion of water and consumable in the mixture. Conversely, a lower inlet water pressure leads to a lower flow rate of water, which requires a lower rate of dispensing the consumable.

According to one embodiment, the actuator 126 is used in conjunction with a disposable liquid pump. The pump and actuator mechanism may be of the same type as shown and described in Greenwald, U.S. Pat. No. 7,578,419; Girard, U.S. Patent Publication No. 2006/0000851; and Girard, U.S. Patent Publication No. 2008/0173705; all of which are hereby incorporated by reference in their entireties. The controller 130 controls the rate of flow of the consumable by varying the rate at which the pump is actuated. In general the rate a which the consumable is dispensed will be proportional to the sensed inlet pressure of the water. For example for a given flow rate of water, as estimated by the inlet pressure measured by the sensor 138, the controller 130 might cause the actuator 126 to initiate a stroke of the pump three times per second. If the water flow rate is doubled, then the pump might be caused to stroke six times per second. It should be understood that diluents other than water could be used.

Figure 3:
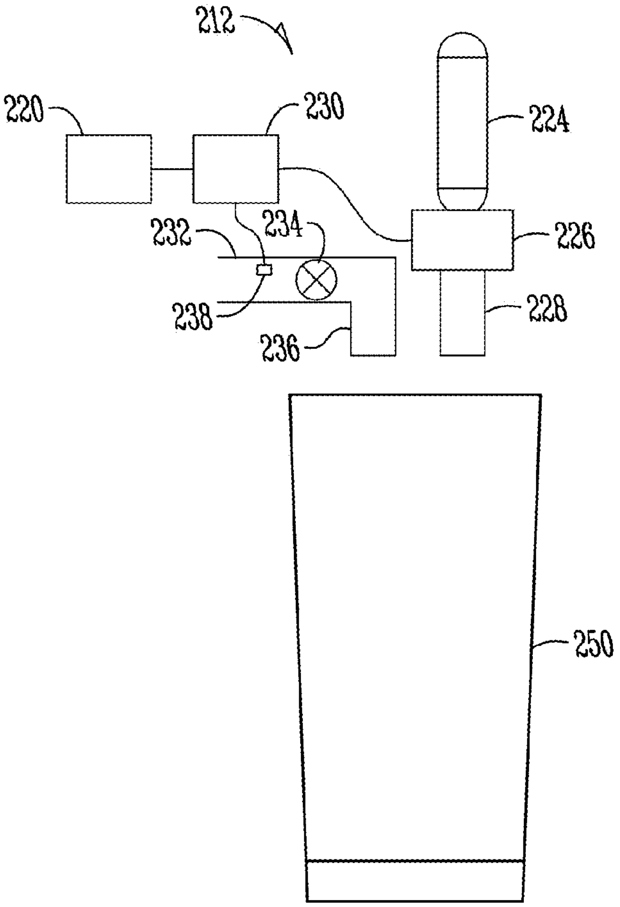
FIG. 3 is a schematic representation of a dispenser according to the present invention that coordinates flow rate of a consumable based on a flow rate of water.

FIG. 3 shows another embodiment of the present invention directed to a beverage dispensing apparatus 212. A flavorant container 224 contains a flavorant concentrate. An actuator 226 selectively dispenses flavorant out of the container 224 through flavorant outlet 228 into a waiting container 250. The actuator 226 is controlled by controller 230, which can take the form of a microprocessor. A water inlet 232 is selectively opened and closed by control valve 234. When the valve 234 is opened, water can flow out of the water outlet 236 into the container 250. External controls 220 are used to provide input to controller 230. The controls 220 might include input devices such as buttons, touch pads, levers and the like. The controls 220 might also include output such as indicator lights, LCD screens, digital displays, audible signals, and the like.

While the controller 120 is depicted as a single physical structure, it could be a plurality of control devices. A pressure sensor 238 is provided in the water inlet 232 to sense the water pressure. The pressure sensor 238 provides a signal to the controller 230 indicating the water pressure sensed by the pressure sensor 238. The controller 230 varies the rate at which the actuator 226 dispenses the consumable dependent upon the pressure level of the water. Roughly speaking the flow rate of water through the valve 234 will be proportional to the water pressure. Therefore, a higher inlet water pressure leads to a greater flow rate of water, which requires a higher rate of dispensing the flavorant in order to maintain a desired concentration of flavorant in the mixture. Conversely, a lower inlet water pressure leads to a lower flow rate of water, which requires a lower rate of dispensing the flavorant.

A user can interface the controls 230 to cause the controller 230 to open the valve 234 to dispense only water, so that the dispenser 212 can act as a water dispenser. Alternatively, a user can use the controls 230 to indicate a flavored beverage is desired. If the controller 230 receives a signal that a flavored beverage is desired it simultaneously opens the valve 234 and actuates the actuator 226 to dispense flavorant. The rate at which the flavorant is dispensed will depend upon the pressure sensed by the pressure sensor 238 and signaled to the controller 230.

Figure 4:
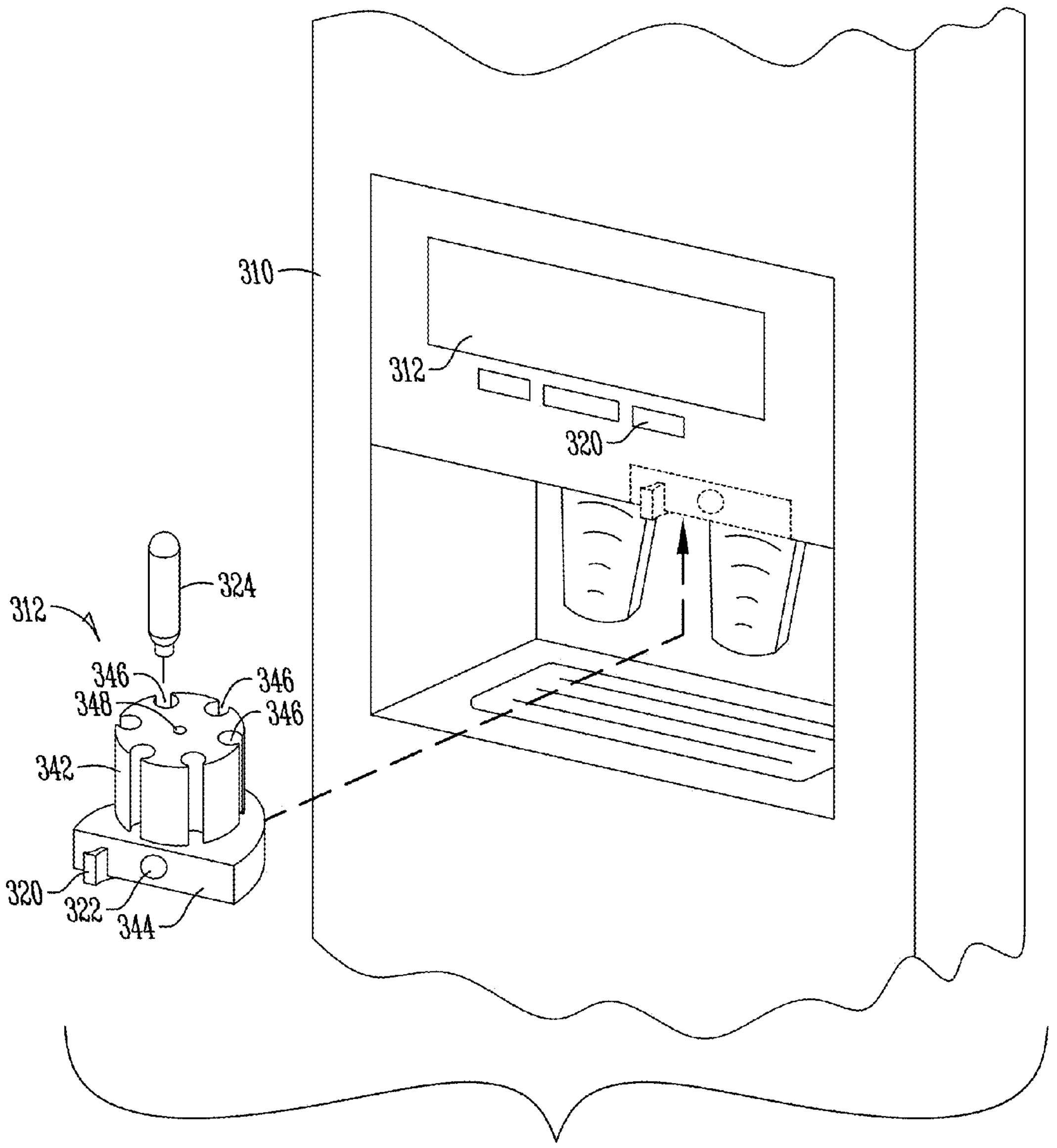
FIG. 4 is a front perspective view of a portion of an appliance that includes a carousel-type flavorant carousel illustrating how the carousel fits into an appliance according to the present invention.
Figure 5:
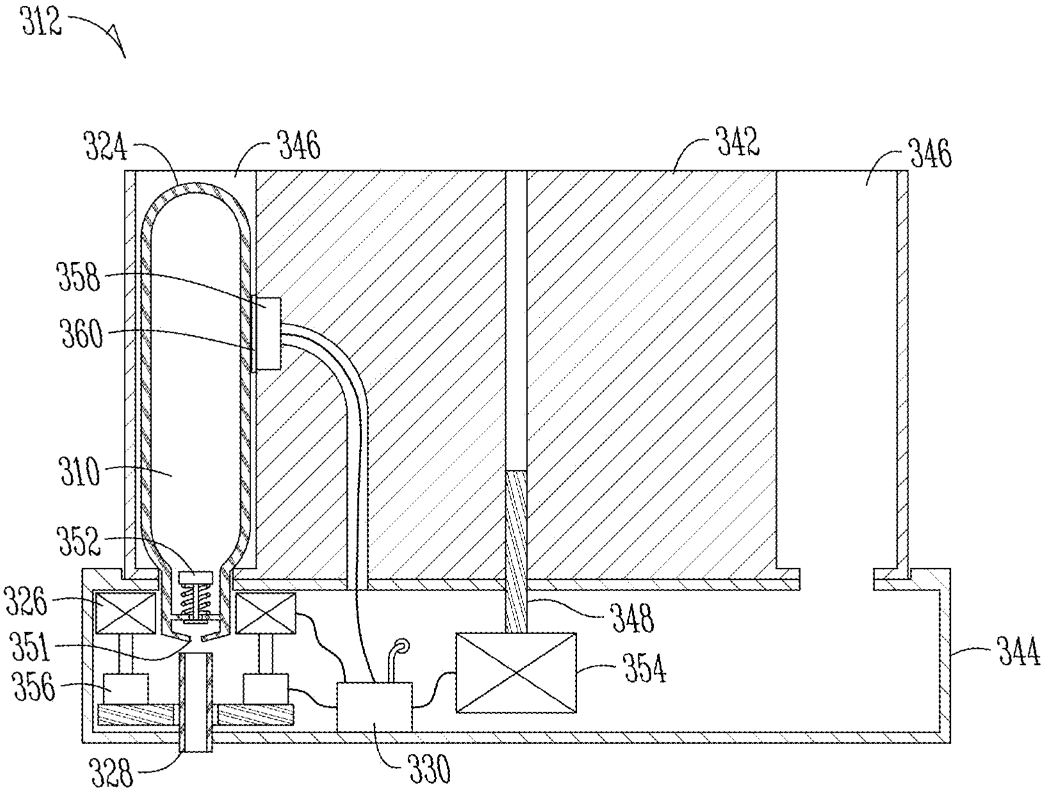
FIG. 5 is a cross-sectional view of a flavored carousel according to one embodiment of the present invention.

FIGS. 4 and 5 show an alternative to the single-consumable-container designs of FIGS. 2 and 3. The dispensing unit 312 of FIGS. 4 and 5 includes a rotating carousel 342 that includes a plurality of sockets 346 for retaining a variety of consumable containers 324. For example the carousel 342 could be loaded with several different flavors of flavorants so that the refrigerator 310 can dispense several different flavors of beverages. It should be appreciated that the carousel-type dispenser 312 of FIGS. 4 and 5 could be advantageously used with the pressure sensing and flow rate adjustment features shown and described in relation to FIGS. 2 and 3.

FIG. 4 shows a portion of an appliance 310 that has the carousel-type dispensing unit 312. The dispensing unit 312 includes a base 344 that attaches to the appliance 310. The rotating carousel 342 is rotatably mounted to the base 344. The dispensing unit 312 includes a control lever 321 and the appliance 310 includes additional controls 320. A display 322, such as a status light, is provide on the dispensing unit 312. An additional visual display 322, such as a display screen, is also provided on the appliance 310. The control lever 321 may be adjusted by a user to indicate a desired strength or concentration of the mixture. The containers 324 may include a quality indicator 360 relating to a quality of the consumable contained within the container 324. For example, indicator could be electrical contacts, the electrical resistance between which indicates a specific type of consumable. For example different flavors of flavorant concentrate could be assigned different resistances. Alternatively, the indicator 360 could be a 2-D or 3-D bar code. Alternatively, the indicator could be a visual symbol recognized by a vision recognition system.

Additional details of the dispensing unit 312 may be seen in the cross-sectional view of FIG. 5. According to the embodiment shown, the container 324 includes a disposable liquid pump 352 that is driven by the actuator 326. The pump 352 selectively pumps the consumable within the container 324 through the container opening 351. A motor 354 is provided within the base 344 to provide rotational force to the carousel portion 342 through an output shaft 348. According to one embodiment, the actuator 326 may be moved up and down by positioner 356 in order to permit clearance of the container 324 as the carousel 342 rotates. A controller 330, which may be a microprocessor, receives inputs and controls the various components. Each of the sockets 346 includes an indicator reader 358 for sensing and reading the indicator 360 and providing a signal to the controller 330 regarding the information provided by the indicator 360.

In operation the carousel-type dispenser 312 permits a single appliance to dispense a variety of mixtures. A user can load a variety of consumable containers 324 to the sockets 346. The indicator reader 358 will read the indicator 360 to determine various information related to the consumable. For example, if the containers 324 contain flavorant, the information might include the flavor of the concentrate in that particular container 324. The information might also include a strength or concentration of the consumable. A user may then make a selection of the mixture desired using the controls 320. A user can vary the strength or concentration of the mix by adjusting the strength indicator 321 to a desired setting. The strength indicator 321 may be a lever that is in communication with the controller 330 to communicate the desired strength or concentration setting to the controller based on the position of the lever 321. Those of skill in the art will be aware of numerous mechanisms for indicating a desired strength of the mixture.

The controller 330 will cause the motor 354 to rotate the carousel 342 until the desired container 324 is aligned with the consumable outlet 328. In this position, the desired container 324 is in position to provide consumable through the outlet 328 when the pump 352 is activated by the controller 330. The consumable will mix with water or other diluent down stream from the outlet 328 to form the desired mixture.

The rate at which the consumable is dispensed will be adjusted to match the strength indicated by the strength indicator 321. The rate at which the consumable is dispensed may also be dependent on the sensed water pressure at the inlet or upon a direct measurement of the water flow rate through the use of a flow meter. The dispensing rate of the consumable dispenser 312 can be adjusted through a variety of mechanisms. For example, the rate at which the pump 352 is actuated by the actuator 326 can be varied to match the desired strength ratio. Alternatively, the size of the orifice 351 could be variable adjustable (not shown). Those of skill in the art will be aware of other mechanisms for controlling the rate at which the consumable is dispensed.

A lockout feature could be provided if the indicator 360 does not match the specified qualities provided to the controller 330. For example, the lockout feature could be used to require consumers to use consumable containers provided only by approved sources. The display screen 322 may be used to display information on where replacement containers can be purchased.

In the instance where the dispensing unit 312 is a beverage flavorant dispenser provided within a refrigerator, the containers 324 will contain flavorant. The indicator 360 will indicate the flavor of the flavorant, so that the controller 330 receives an indication of the flavor of the flavorant. The controller 330 can provide a listing of the various flavors on the display screen 322 so that a user is aware of the possible flavors. The user can then select a desired flavor using the controls 320. The user can also select a relative strength using the control lever 321. Once the flavor is selected, the controller 330 will cause the motor 354 to rotate the carousel 342 until the desired container 324 is aligned with the consumable outlet 328. In this position, the desired container 324 is in position to provide flavorant through the outlet 328 when the pump 352 is activated by the controller 330. The user can initiate a dispensing operation by pressing a glass or other container against the actuation paddle. The flavorant will mix with water downstream from the outlet 328 to form the desired beverage.

Although specific embodiments are described herein, the present invention contemplates numerous variations, options, and alternatives, including variations in the structure or configuration of the appliance, and variations in the type of materials used. The present invention is not to be limited to the specific embodiments described herein or combinations of the specific embodiments described.

What is claimed is:

1. A household appliance, the appliance comprising:

a water inlet for attachment to a water supply;

a container containing a consumable;

a dispenser within the container that selectively dispenses a portion of the consumable from the container at an outlet;

a water control valve between the water inlet and the outlet;

a pressure sensor upstream from the water control valve that senses a water pressure at the water inlet; and a dispenser control adapted to automatically vary a rate at which the dispenser will dispense the consumable dependent upon the water pressure at the water inlet prior to dispensing the consumable.

2. The appliance of claim 1, wherein the consumable is a flavorant.

3. The appliance of claim 2, further comprising an input for indicating a desired beverage strength, and further wherein the dispenser comprises a pump within the container and the dispenser control automatically varies a rate at which the pump dispenses the consumable dependent upon an input desired beverage strength.

4. The appliance of claim 1, wherein the dispenser control comprises a microprocessor.

5. The appliance of claim 1, further comprising a sensor for sensing an information indicator on the container; and a display for displaying information about the container based on the information indicator.

6. A household appliance with a water and flavored beverage dispenser that allows a consumer to select a flavorant to be added to water to form a flavored beverage, the appliance comprising:

an appliance body;

a rotatable carousel mounted in the appliance body that includes a plurality of sockets for receiving containers containing flavorant;

a plurality of containers in the sockets;

a sensor adapted to sense an indication of the flavor of the flavorant of a first container retained in a first socket and to generate a signal that indicates the flavor;

a controller that receives the signal that indicates the flavor, the controller adapted to generate a flavor display instruction;

a display adapted to display the flavor in response to the flavor display instruction received from the controller; and a dispensing mechanism within each of the plurality of containers, wherein the dispensing mechanism in the first container selectively dispenses flavorant from the first container into a supply of water to form a beverage.

7. The appliance of claim 6, further comprising an input for indicating a desired beverage strength, and further wherein the controller is adapted to instruct the dispensing mechanism to automatically vary a rate at which the dispensing mechanism dispenses the flavorant dependent upon an input desired beverage strength.

8. The appliance of claim 6, wherein the sensor senses an indication of whether the first container includes indicia that the first container was manufactured by an approved source.

9. A household appliance comprising:

an appliance body;

a rotatable carousel mounted in the appliance body that includes a plurality of sockets for receiving flavorant containers;

a water inlet for attachment to a water supply;

a water outlet downstream from the water inlet;

a water control valve between the water inlet and the water outlet;

a plurality of flavorant containers in the sockets containing flavorant;

a flavorant dispenser within each of the plurality of flavorant containers that selectively dispenses flavorant from one of the flavorant containers;

a sensor that senses a water quality at the water inlet upstream from the water control valve;

a dispensing mechanism that selectively controls the flavorant dispenser and dispenses flavorant from the one of the flavorant containers into water from the water outlet to form a flavored beverage; and a dispensing mechanism control that automatically varies a rate at which the dispensing mechanism dispenses the flavorant dependent upon the sensed water quality.

10. The household appliance of claim 9, further comprising an input for indicating a desired beverage strength, and further wherein the dispensing mechanism control automatically varies a rate at which the flavorant dispenser dispenses the flavorant dependent upon an input desired beverage strength.

11. The appliance of claim 9, further comprising a sensor for sensing a property of a first container retained in a first socket, and wherein the property of the first container is an indication of the flavor of the flavorant in the first container.

12. The appliance of claim 11, wherein the sensor senses whether the first container includes indicia that the first container was manufactured by an approved source.

13. The appliance of claim 9, wherein the dispensing mechanism control comprises a microprocessor.

14. The appliance of claim 9, wherein the sensor is a pressure sensor and the sensed quality is water pressure.

15. The appliance of claim 9, wherein the sensor is a flow meter and the sensed quality is a water flow rate.

* * * * *